(12) United States Patent
Holmes

(10) Patent No.: US 8,261,575 B1
(45) Date of Patent: Sep. 11, 2012

(54) SELF COOLING MOTOR SYSTEM

(76) Inventor: Jeremy Holmes, Miami, FL (US)

( * ) Notice: Subject to any disclaimer, the term of this patent is extended or adjusted under 35 U.S.C. 154(b) by 637 days.

(21) Appl. No.: 12/459,259

(22) Filed: Jun. 29, 2009

Related U.S. Application Data

(63) Continuation-in-part of application No. 11/037,583, filed on Jan. 18, 2005, now Pat. No. 7,552,715.

(51) Int. Cl.
F25B 31/00 (2006.01)
H02K 9/00 (2006.01)
H02K 1/32 (2006.01)

(52) U.S. Cl. ............ 62/505; 310/54; 310/58; 310/60 R; 310/64

(58) Field of Classification Search .................. 62/505, 62/508, 434; 310/54, 58, 60 R, 64, 57, 89
See application file for complete search history.

(56) References Cited

U.S. PATENT DOCUMENTS

| | | | |
|---|---|---|---|
| 1,301,845 A | 4/1919 | Hellmund | |
| 2,476,892 A | 7/1949 | Mueller | |
| 2,615,938 A | 10/1952 | Gynt | |
| 3,361,353 A | 1/1968 | Millman | |
| 3,648,669 A | 3/1972 | Rank | |
| 3,762,378 A | 10/1973 | Bitonti | |
| 4,030,456 A | 6/1977 | Corpus | |
| 4,059,078 A | 11/1977 | Ramiro de la Rosa | |
| 4,346,675 A | 8/1982 | Holliday, Jr. | |
| 4,359,971 A | 11/1982 | Rogers | |
| 4,391,229 A | 7/1983 | Turner | |
| 4,458,655 A | 7/1984 | Oza | |
| 4,514,652 A | 4/1985 | Olson | |
| 4,577,085 A | 3/1986 | Burgher et al. | |
| 4,728,840 A * | 3/1988 | Newhouse | 310/113 |
| 4,745,314 A | 5/1988 | Nakano | |
| 4,800,848 A | 1/1989 | Hubbard | |
| 4,946,103 A | 8/1990 | Ganser | |
| 4,986,223 A | 1/1991 | Mahoney | |
| 5,034,639 A | 7/1991 | Huss et al. | |
| 5,159,915 A | 11/1992 | Saito et al. | |
| 5,317,224 A | 5/1994 | Ragaly | |
| 5,452,858 A | 9/1995 | Tsuzuki et al. | |
| 5,627,420 A * | 5/1997 | Rinker et al. | 310/87 |
| 5,758,826 A | 6/1998 | Nines | |
| 6,296,197 B1 | 10/2001 | Boecking | |
| 6,305,398 B1 | 10/2001 | Logar et al. | |
| 6,879,069 B1 * | 4/2005 | Weidman et al. | 310/61 |
| 6,928,992 B1 | 8/2005 | Holmes | |
| 7,552,715 B1 | 6/2009 | Holmes | |

FOREIGN PATENT DOCUMENTS

| | | |
|---|---|---|
| JP | 20008883 A | 1/2000 |
| WO | WO 9415092 A1 | 7/1994 |

* cited by examiner

*Primary Examiner* — Chen Wen Jiang
(74) *Attorney, Agent, or Firm* — Malloy & Malloy, P.L.

(57) ABSTRACT

A self cooling motor system includes an internally cooled motor assembly operationally interconnected to a heat transfer assembly. The internally cooled motor assembly includes a winding assembly having one or more winding, each winding constructed of an electrically conductive material and having a fluid passage extending lengthwise therethrough. A fluid heat transfer media flows through the winding(s) while the internally cooled motor assembly is in operation, and the fluid heat transfer media is structured to remove a predetermined amount of heat from the winding(s) of the motor assembly. The fluid heat transfer media is transferred to the heat transfer assembly, where heat is dissipated from the fluid heat transfer media, reducing its temperature to a preselected exit temperature, prior to reintroduction into the winding(s) of the internally cooled motor assembly.

23 Claims, 10 Drawing Sheets

US 8,261,575 B1

SELF COOLING MOTOR SYSTEM

CLAIM OF PRIORITY

The present patent application is a continuation-in-part and claims priority to previously filed and U.S. patent application Ser. No. 11/037,583, filed on Jan. 18, 2005, which has matured into U.S. Pat. No. 7,552,715 on Jun. 30, 2009 and which is incorporated by reference herein in its entirety.

BACKGROUND OF THE INVENTION

1. Field of the Invention

The present invention is directed to a self cooling motor system comprising an internally cooled motor assembly. Specifically, the internally cooled motor assembly comprises a winding assembly including one or more windings having a fluid passage extending lengthwise from an inlet aperture to an outlet aperture and being structured to permit a fluid heat transfer media to flow therethrough. Each winding further comprises a helix configuration structured such that centrifugal forces generated by the rotation of the motor shaft are sufficient to force the flow of fluid heat transfer media through the windings, i.e., thereby "self pumping" the heat transfer media therethrough.

2. Description of the Related Art

The benefits derived from the addition of a heated vapor, for example, steam, to a conventional air-fuel mixture prior to injection into a cylinder of a conventional internal combustion engine have been known for some time. One important advantage is the increase in the percentage of completion of combustion, which necessarily results in an increase in the horsepower generated and an improvement in fuel efficiency. The improved operational efficiency further results in an improvement in the air emissions (i.e. a reduction in emissions). Given the numerous advantages available from the addition of a vapor, such as steam, to a conventional air-fuel mixture, numerous devices have been developed attempting to harness and control this process. However, to date, few of these devices have found widespread acceptance and utilization, mainly due to the complexity of handling and, more importantly, controlling the quality and/or the quantity or rate of flow of the steam.

In particular, a common pitfall of many of these devices is that the components utilized for steam generation and delivery are often related to certain operating characteristics of the engine, such as combustion, as well as intake manifold vacuum pressure, engine speed, and/or quality and quantity of high temperature radiation from operation of the engine available for steam generation. In these devices, the quality and/or quantity of steam generated is dependent on one or more operating characteristics of the engine itself, once again, such as combustion, thereby requiring almost continuous adjustment of the operation of the engine to maintain a constant rate of flow of the steam. It is primarily this factor which is believed to be the reason why these devices have not achieved widespread acceptance and utilization.

Additionally, external factors, such as adverse weather conditions, may have a particularly severe and negative impact upon the viability of adding steam to a conventional air-fuel mixture. For example, many areas of the United States experience outdoor temperatures well below the freezing point of water for at least some portion of the year. Under these conditions, any residual water vapor remaining in a device, or its appurtenances, intended for outdoor use, such as an automobile engine, is at risk of freezing when the engine is not operating, which could easily result in temporary blockage of flow through the steam injection device. In more severe cases, freezing water vapor could result in the rupturing of lines, freezing of throttle plates, fittings, and/or other components of the steam injection device as the freezing water vapor expands on the inside of these components. Thus, in spite of the numerous advantages which may be obtained from the addition of steam to a conventional air-fuel mixture, the widespread acceptance and utilization of devices structured to achieve this goal has not become a reality.

In addition to the injection of steam into a conventional air-fuel mixture for conventional internal combustion engines, other engines which are structured to operate solely on steam are well known, for example, large scale conventional steam turbines and steam locomotive engines. These large scale systems are generally structured to operate on an almost continuous basis, and as such, they often derive their input energy from a continuous feed of live steam having an elevated temperature and pressure. Historically, however, attempts to scale down and regulate these large scale, continuous, live steam systems in relatively small scale, intermittently operated systems, for example, a four cycle engine, have been plagued with significant efficiency losses. It is believed that among the efficiency problems associated with the small scale systems is the energy loss of the live steam as it is acted upon by the dynamics of the small scale system. While it is understood that dynamic losses are present in large scale systems as well, the overall impact of the energy loss of the live steam is not as significant in terms of system efficiency, due in part to the large volume of steam utilized in such systems, as it is in relatively small scale systems.

A further difficulty encountered with attempts to scale down continuous, live steam systems is the accurate control of the quantity or rate of flow of live steam to a particular component of the system. This is a problem common to handling any compressible material, as there is a delicate balance and constant trade off between pressure, volume, and temperature. As such, and as noted above, given that steam energy losses are directly related to the system configuration, materials of construction, insulation factors, etc., these losses are exaggerated in small scale systems, particularly due to increased frictional and thermal losses through smaller scale pipes and fittings. Thus, to accurately control the quantity or rate of flow of steam to be delivered to a particular component of a system, the balance and interaction between the various components of the system and their impact upon a given quantity of steam at a given temperature and pressure must be completely understood and configured to ensure accurate delivery of the desired quantity and quality of steam at any point in the system. As it should be appreciated, given the extreme change in temperatures in the components of an intermittently operated small scale engine, for example, a four cycle automobile engine, accurate control of the quality and/or quantity of steam to a particular component of such an engine requires almost continuous and precise adjustment of the quality and/or quantity of the steam injection device.

As such, it would be beneficial for an assembly to permit direct injection of an accurately controlled amount of an operative fluid at a predetermined temperature and pressure to a combustion chamber of a small scale engine or other device, such as, for example, a stirling engine or a 4-cycle steam engine. Further, it would be advantageous for such an assembly to be capable of providing the accurately controlled amount of operative fluid at any one of a number of cyclic rates, such as the small scale engine or other device may demand due to different loads. Additionally, it would be helpful for such an assembly to be capable of providing any one of a number of accurately controlled amounts of the operative fluid at a given cyclic rate, such as the small scale engine or other device may demand due to different loads. Also, it would be beneficial to provide an assembly which is able to quickly and efficiently alternate between the numerous cyclic rates or accurately controlled amounts per operating cycle as may be required by the small scale engine or other devices, such as, for example, a stirling engine or a 4-cycle steam engine, without adversely affecting the operational efficiency of the engine or other device.

With regard to electric motors, a direct correlation exists between operating efficiency and temperature. In general, higher temperatures reduce the operating efficiency of an electric motor due to an increase in the resistance of the conductive windings of such motors at elevated temperatures. In order to control the operating temperature of electric motors, and in particular, the operating temperature of the conductive windings, auxiliary temperature control systems are often implemented, which are independent of the operation of the motor, such as a fan, a forced flow radiator, or even a temperature controlled environment in which a motor operates, all of which require additional external energy resources and expenses related to the operation of an electric motors, thereby resulting in a decrease in the overall operating efficiency of the same. Alternatively, or in combination with such auxiliary temperature control systems, high resistance conductive windings have been employed in electric motors in order to prevent runaway operating temperatures, however, the trade-off in temperature control comes in the form of a reduction in the inductive magnetic forces generated at the poles of the electric motor, thereby resulting in a reduction in the operating efficiency of the motor, which is often significant.

As such, it would be beneficial to provide an electric motor that is not reliant upon any auxiliary temperature control system to maintain its operation within a desired operating temperature range, thereby eliminating the need for additional external energy resources and the related operating expenses associated therewith. More in particular, it would be advantageous for an electric motor assembly to operate in conjunction with a temperature control assembly to maintain the operating temperature of an electric motor within a desired operating range, wherein the temperature control assembly is driven by the electric motor itself, and is not reliant upon any additional external energy resources to operate. It would be a further benefit for such a temperature control assembly to allow an electric motor comprising low resistance conductive windings to operate within a desired operating temperature range, thereby maximizing the inductive magnetic forces generated at the poles of the electric motor. A further advantage may be realized by creating a substantially closed system wherein an electric motor is operated within a predetermined operating temperature range selected for maximum efficiency, with little to no expenditure of any additional external energy resources.

SUMMARY OF THE INVENTION

The present invention is directed to a universal injection valve assembly comprising an injector assembly having a housing. The injector assembly includes an inlet aperture and an outlet aperture, generally disposed to receive and discharge, respectively, an operative fluid into and out of the housing of the injector assembly. In at least one embodiment of the present invention, the inlet and outlet apertures are disposed in fluid communication with a chamber, structured to at least temporarily hold the operative fluid within the housing. Further, in at least one embodiment of the present invention, the housing includes a seat disposed adjacent to the outlet aperture.

In addition to the injector assembly, the universal injection valve assembly of the present invention comprises a control member which is movably interconnected to the housing. The control member is normally disposed in an operative position relative to the housing. More specifically, the control member is disposed in a sealing engagement with the seat of the housing, thereby at least partially defining the operative position. In at least one embodiment of the present invention, the control member includes a distal end. In this embodiment, the operative position is further defined by the distal end of the control member being disposed in a fluid restricting engagement with the seat of the housing.

The universal injection valve assembly of the present invention further comprises an actuation assembly, wherein the actuation assembly includes an actuator. The actuator is cooperatively disposed to at least temporarily displace the control member out of the operative position. In at least one embodiment of the present invention, the actuation assembly also includes an induction mechanism which is structured to at least temporarily dispose the actuator into an energized state. Furthermore, in this embodiment, the control member at least partially comprises material which is attracted to the actuator in the energized state, thereby facilitating the displacement of the control member from the operative position.

The present disclosure is also directed to an internally cooled motor assembly comprising a frame having a shaft assembly. The shaft assembly includes a shaft having an open end and a sealed end, wherein the open end has an inlet and an outlet interconnected in a fluid communicating relation by a channel extending therebetween. The frame includes bearings disposed at opposite ends to support the shaft in the frame in a rotational configuration, i.e. the shaft is free to rotate relative to the frame while the frame remains fixed relative to the shaft.

An armature assembly is mounted to the shaft and is structured to rotate with the shaft, the armature assembly having at least one pole extending outwardly and substantially perpendicular to the shaft. In at least one embodiment, the armature assembly comprises a plurality of poles extending outwardly from the shaft. Each pole has a proximal end disposed adjacent the shaft and a distal end disposed outwardly from the shaft. The internally cooled motor assembly further comprises a winding assembly including at least one winding affixed to the armature assembly, however in at least one embodiment, the winding assembly comprises a plurality of windings. More in particular, the least one winding is disposed in an overlying relation to at least one pole of the armature assembly. Each winding has an inlet aperture, an outlet aperture, and a fluid passage extending lengthwise therethrough to permit the flow of a fluid heat transfer media through the winding. The flow of the fluid heat transfer media though the winding(s) effectively removes sufficient heat from the winding(s) to allow the internally cooled motor assembly to operate efficiently, without reliance on additional external energy resources in order to maintain operation within the prescribed temperature range, thus providing additional, overall operating efficiency by eliminating external energy related operating costs. Further, in at least one embodiment, the internally cooled motor assembly is "self pumping", furthering the reduction and/or elimination of external energy related operating costs, and further improving the overall operating efficiency.

To facilitate the flow of the fluid heat transfer media though the windings, the internally cooled motor assembly also includes an inlet fluid transfer slip ring assembly interconnected to an open end of the shaft and disposed in a fluid transferring configuration with an inlet of the shaft. The shaft also having an outlet interconnected to the inlet aperture of each winding and disposed in a fluid transferring relation therewith. The internally cooled motor assembly also includes an outlet fluid transfer slip ring assembly disposed in a fluid transferring orientation to the outlet aperture of each winding, wherein the outlet aperture of each winding is disposed proximate the distal end of a corresponding pole extending outwardly from the shaft. Further, each winding comprises a helix configuration between its inlet and outlet apertures, the helix configuration being specifically structured such that rotation of the armature assembly at a predetermined speed creates a centrifugal force sufficient to maintain a predetermined flowrate of the fluid heat transfer media through the fluid passage of each winding, wherein a direction of flow of the fluid heat transfer media through each winding is from its inlet aperture to its outlet aperture. Moreover, flow of the fluid heat transfer media through the fluid passage of each winding at the predetermined flowrate results in a transfer of a predetermined amount of heat from each winding to the fluid heat transfer media, thereby maintaining an operating temperature of the internally cooled motor assembly within a predetermined operating range, once again, resulting in improved overall operating efficiency of the internally cooled motor assembly.

The present disclosure is further directed to a self cooling motor system having an internally cooled motor assembly, such as, by way of example, the motor assembly disclosed above, disposed in an operative relationship with a heat transfer assembly, wherein the heat transfer assembly is structured to receive the fluid heat transfer media from the internally cooled motor assembly, and to remove a predetermined amount of heat therefrom, prior to reintroduction of the fluid heat transfer media into the internally cooled motor assembly. Further, the internally cooled motor assembly and the heat transfer assembly are cooperatively structured to operate as an essentially closed system, wherein the heat transfer assembly is driven by the electric motor itself, and is not reliant upon any additional external energy resources to operate These and other features of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
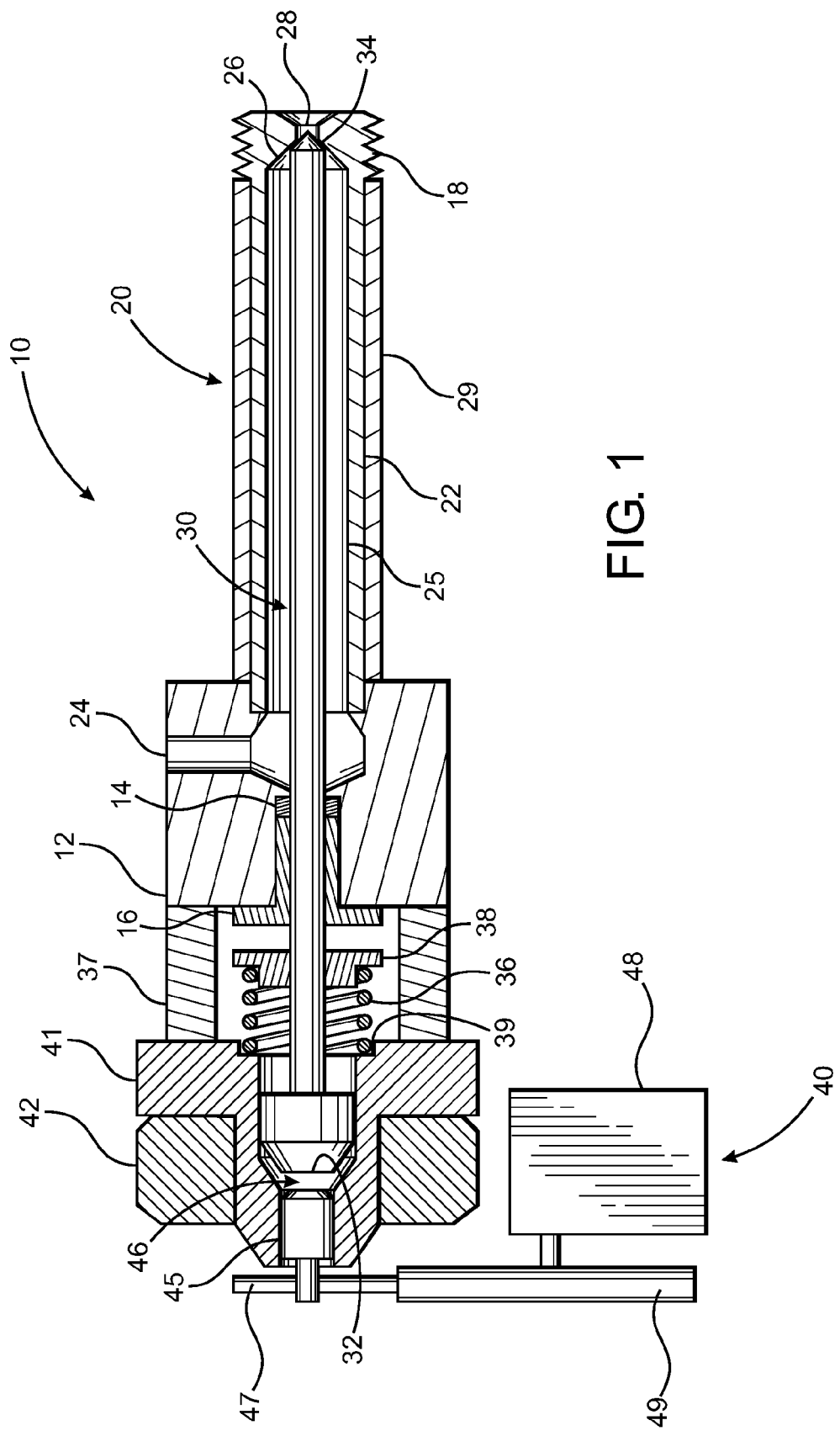
FIG. 1 is a cross-sectional view of one embodiment of a universal injection valve assembly of the present invention illustrating a control member in a fully closed orientation.

As previously indicated, the present invention is directed to a universal injection valve assembly, generally shown as 10 throughout the Figures. The universal injection valve assembly 10 comprises an injector assembly, generally shown as 20, which includes a housing 22. In at least one embodiment of the present invention, the housing 22 has an elongated configuration, as illustrated in the Figures, having an adaptor 18 at one end to facilitate the connection of the universal injection valve assembly 10 to a small scale engine or other device including, but not limited to, a stirling engine or a 4-cycle steam engine. The adaptor 18 may comprise a plurality of standard size external threads, as illustrated in the Figures, such that the entire universal injection valve assembly 10 may be connected to a standard size threaded socket of the small scale engine or other device. The adapter 18 is further structured to permit direct injection of an operative fluid into a combustion chamber or similar structure of the small scale engine or other device, thereby eliminating the lag time normally associated with providing the operative fluid from a standard injector assembly to a device.

The injector assembly 20 includes an inlet aperture 24 and an outlet aperture 28. In a preferred embodiment of the present invention, the inlet aperture 24 and the outlet aperture 28 are disposed in fluid communication with a chamber 25, having a fixed volume, such that an operative fluid enters the injector assembly 20 through the inlet aperture 24 and flows into the chamber 25. Upon actuation of the universal injection valve assembly 10, an accurately controlled amount of the operative fluid is directly injected from the chamber 25 through the outlet aperture 28, as will be explained in greater detail below. The present invention may utilize water or any one of a number of other compressible materials, as the operative fluid. When water is the operative fluid it is preferably at an elevated temperature and pressure, such as, by way of example only, approximately 700 degrees Fahrenheit and 3,200 pounds per square inch, respectively.

Additionally, the housing 22 of the present invention further comprises a seat 26 disposed adjacent to the outlet aperture 28, as illustrated in the Figures. In at least one embodiment of the present invention, the seat 26 comprises a conical configuration with the narrow end of the cone terminating at the outlet aperture 28. The significance of the conical configuration of the seat 26 will become apparent as the universal injection valve assembly 10 is described in further detail below.

In at least one embodiment of the present invention, the injector assembly 20 further comprises an injector temperature control unit 29. As illustrated throughout the Figures, the injector temperature control unit 29 is preferably disposed in an at least partially overlying relation to the housing 22 of the injector assembly 20, and is structured to regulate the temperature of the operative fluid, and more in particular, to maintain it at a predetermined temperature while it is in the chamber 25. This becomes important when a sufficient temperature differential exists between the block of the engine, or other device to which the injector assembly 20 is attached, and the housing 22 of the injector assembly 20, and in such instances, maintaining the temperature of the housing 22 relatively constant aids in maintaining the temperature of the operative fluid relatively constant. The injector temperature control unit 29 of the present invention may comprise any one of a number of temperature regulating devices including, but not limited to, an external electrical heating element, an immersion heating element, or a non-contact heat exchanger structured to circulate water, steam, or another heat transfer media around the housing 22 of the injector assembly 20. Regardless of the type of temperature control device utilized, the injector temperature control unit 29 is capable of regulating the temperature of the operative fluid and maintaining it at the predetermined temperature while it is in the chamber 25 of the housing 22.

The universal injection valve assembly 10 of the present invention further comprises a control member, generally shown as 30. The control member 30 is movably interconnected to the injector assembly 20 and is normally disposed in an operative position relative to the housing 22. More specifically, the control member 30 is normally disposed in a sealing engagement with the seat 26 of the housing 22 such that the operative fluid is not directly injected through the outlet aperture 28 of the housing 22 until the universal injection valve assembly 10 is actuated. The sealing engagement of the control member 30 with the seat 26 of the housing 22 at least partially defines the operative position of the control member 30 relative to the housing 22.

In a preferred embodiment of the universal injection valve assembly 10, the control member 30 includes a proximal end 32 and a distal end 34, wherein the distal end 34 of the control member 30 comprises a generally conical configuration, as illustrated throughout the Figures. Further, the generally conical configuration of the distal end 34 of the control member 30 is preferably structured to fit within the generally conical configuration of the seat 26 of the housing 22, such that the distal end 34 is disposable into a fluid restricting engagement with the seat 26. The fluid restricting engagement further defines the operative position of the control member 30 relative to the housing 22, in a fully closed orientation, as illustrated in FIG. 1.

The present invention further comprises a seal 14 which is disposed to engage at least a portion of the control member 30. Specifically, the seal 14 is mounted in a seal housing 12, which is positioned adjacent the housing 22 of the injector assembly 20, and the seal 14 is disposed around at least a portion of the control member 30. The seal housing 12 further comprises a bearing member 16, which is also preferably disposed around at least a portion of the control member 30. The seal 14 and the bearing member 16 are structured to permit at least a portion of the control member 30 to move longitudinally along the chamber 25 and the seal housing 12 while minimizing or, preferably, eliminating the escape of the operative fluid from the chamber 25 through the interface of the seal 14 and the bearing member 16 with the control member 30.

Additionally, the universal injection valve assembly 10 of the present invention further comprises a biasing element 36, disposed in a biasing element housing 37, structured to engage the control member 30. Specifically, the biasing element 36 is structured to at least temporarily retain the control member 30 in the normally operative position relative to the housing 22. As such, one portion of the biasing element 36 is interconnected to the control member 30 by a first retention mechanism 38, while another portion of the biasing element 36 is retained in a substantially fixed position, in relation to the control member 30, by a second retention mechanism 39. As illustrated in FIG. 1, at least one embodiment of the present invention comprises a spring-like structure as the biasing element 36, with the first retention mechanism 38 attached directly to the control member 30, while the second retention mechanism 39 comprises a notch or a groove in an actuator 41, which is described in detail below. However, it is envisioned that alternate embodiments of the present invention may comprise another type of biasing element 36 and/or retention mechanisms 38, 39 to retain the biasing element 36 and the control member 30 in position within the biasing element housing 37 and relative to the housing 22 of the injector assembly 20, respectively.

The universal injection valve assembly 10 of the present invention further comprises an actuation assembly, generally shown as 40 throughout the Figures. The actuation assembly 40 includes an actuator 41 which is preferably disposed in an at least partially surrounding relationship with at least the proximal end 32 of the control member 30. In addition, the actuation assembly 40 includes an induction mechanism 42, which is preferably disposed in an at least partially surrounding relationship with at least a portion of the actuator 41, as illustrated in the Figures. In one embodiment of the present invention, the induction mechanism 42 comprises a wire 42' configured in a multiplicity of coils wrapped around at least a portion of the actuator 41. The induction mechanism 42 is structured to intermittently dispose the actuator 41 into an energized state at any one of a plurality of cyclic rates. In a preferred embodiment of the present invention, the energized state comprises the generation of an electromagnetic field in the actuator 41.

A preferred embodiment further comprises an electrical switching array, for example, a mosfet array, which comprises a plurality of mosfets wired in parallel and structured to trigger simultaneously with a DC power source, such as a conventional 12 volt DC automobile battery. In one embodiment, a total of six mosfets, each having a continuous load rating of 40 amperes at 12 volts D.C. are utilized and, as a result, the entire array has a capacity of 240 amperes at 12 volts D.C. As such, the electrical switching array is more than sufficient to intermittently dispose the actuator 41 into an energized state at any one of the plurality of cyclic rates which may be required for efficient operation of the small scale engine or other device utilizing the universal injection valve assembly 10. In addition, the electrical switching array is quickly and efficiently adjustable to alternate between the plurality of cyclic rates by, for example, a computer control device.

Further, in a preferred embodiment, the control member 30 at least partially comprises a material, preferably in the proximal end 32, which is attracted to the actuator 41 in the energized state. Therefore, the actuator 41 in the energized state is cooperatively disposed to displace the control member 30 from the operative position relative to the housing 22, thereby at least partially opening the path of flow between the chamber 25 and the outlet aperture 28, allowing direct injection of the accurately controlled amount of the operative fluid from the injector assembly 20 directly into the chamber or other structure of the device to which the universal injection valve assembly 10 is connected. It is understood that any one of a number of other types of induction mechanisms 42 may be utilized and fall within the scope and intent of the present invention.

Figure 3:
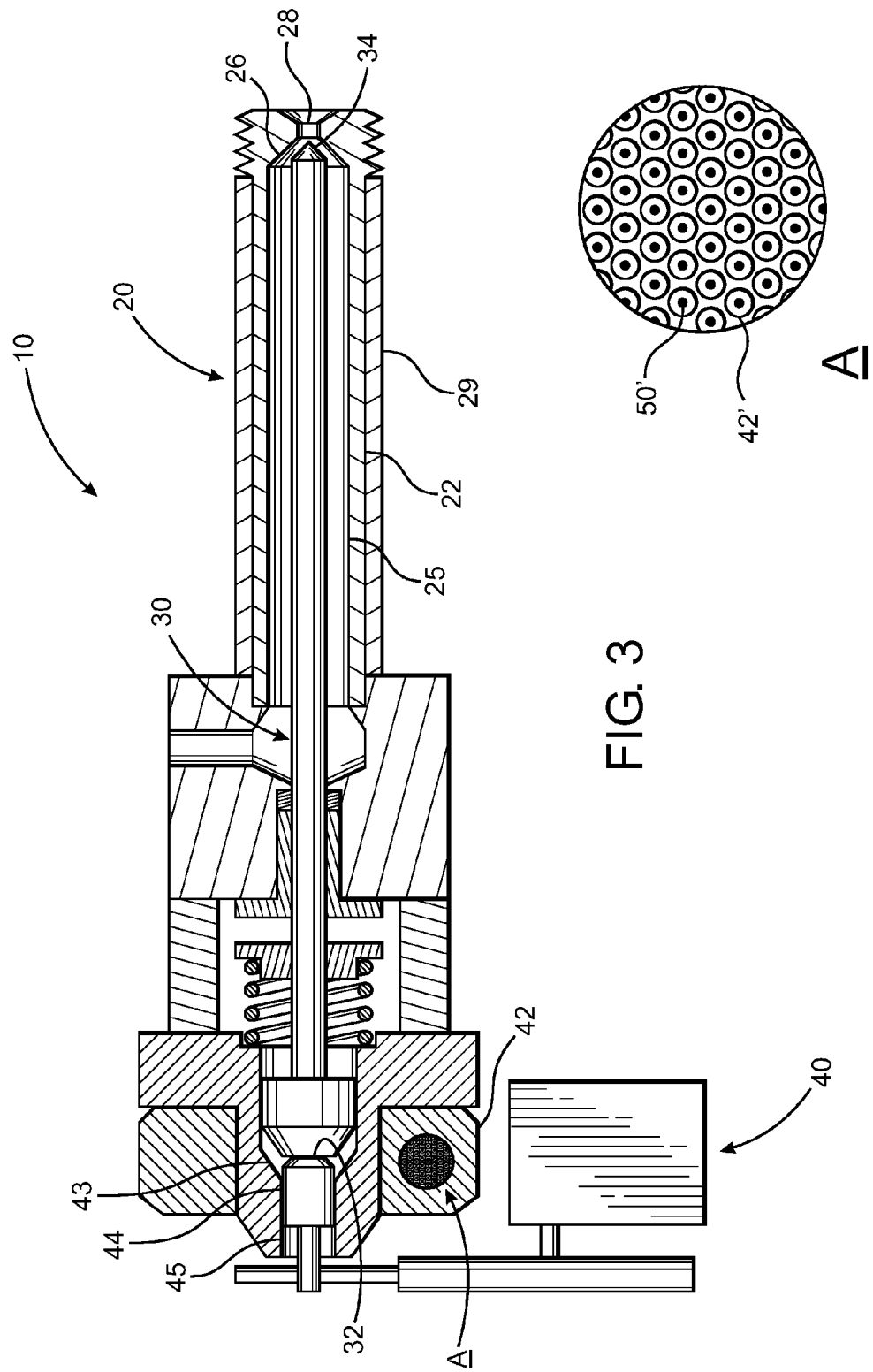
FIG. 3 is a cross-sectional view of the embodiment of FIG. 1 illustrating the control member in a partially open orientation, and further providing an exploded cross-sectional view of a portion of an induction mechanism and an inductor temperature control unit, as shown in "A".

Additionally, in at least one embodiment of the present invention, the actuation assembly 40 further comprises an inductor temperature control unit 50 which is structured to regulate the temperature of the induction mechanism 42. In one preferred embodiment, the inductor temperature control unit 50 comprises a fluid passage 50' extending lengthwise through the wire 42' of the induction mechanism 42, as illustrated in the exploded cross-sectional view identified as A, in FIG. 3. In this embodiment, a fluid heat transfer media, such as water or another high impedance coolant, is circulated through the fluid passage 50' of the inductor temperature control unit 50 thereby removing heat from the wire 42' so as to prevent the wire 42' of the induction mechanism 42 from overheating.

Figure 2:
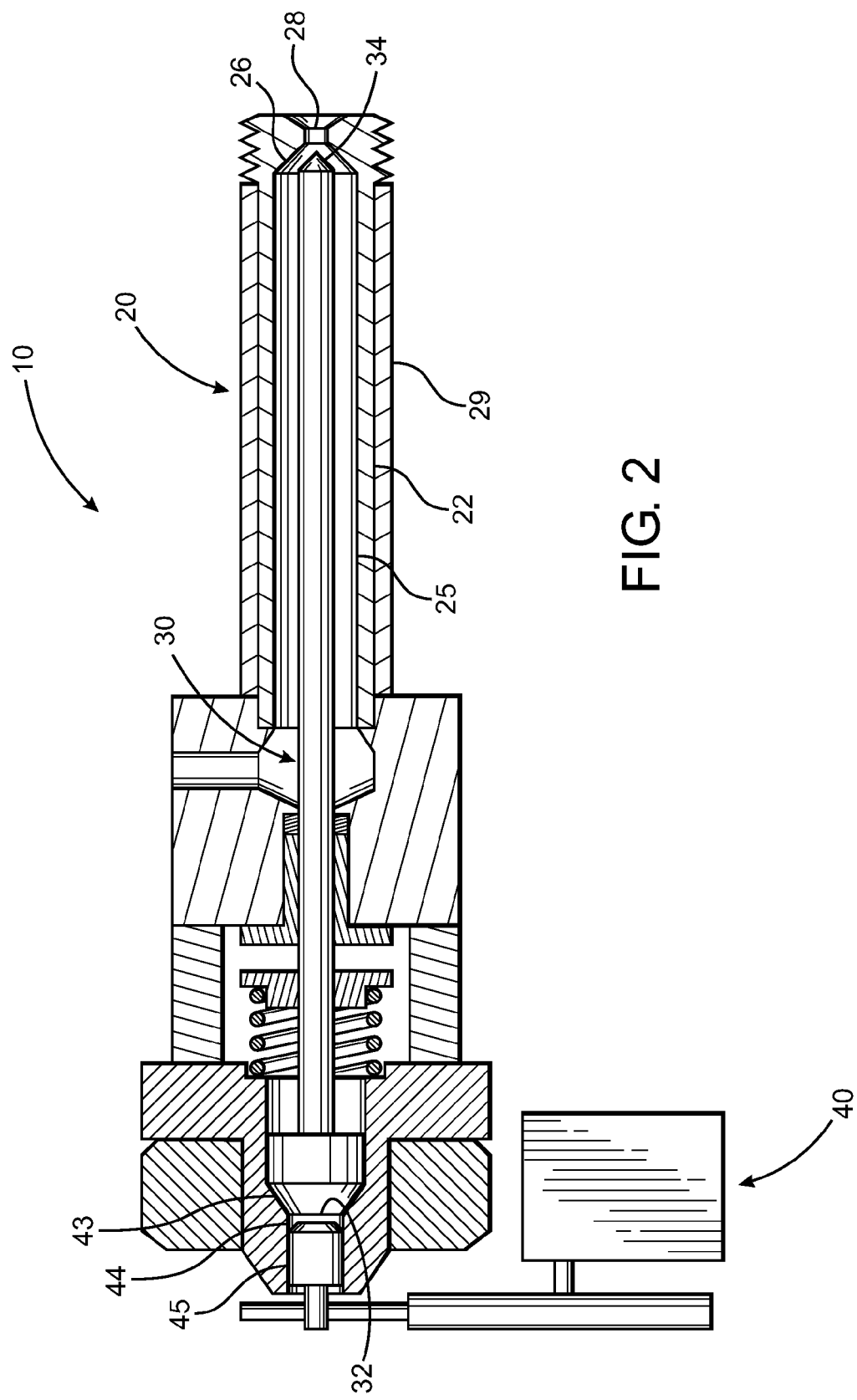
FIG. 2 is a cross-sectional view of the embodiment of FIG. 1 illustrating the control member in a fully open orientation.

The actuation assembly 40 of the present invention further comprises a primary stop 43 which is structured and disposed to contact the control member 30 to limit the displacement of the control member 30 when the actuator 41 is in an energized state. FIG. 2 illustrates the displacement of the control member 30 into contact with the primary stop 43, resulting in a fully open orientation of the universal injection valve assembly 10. The primary stop 43, similar to the seat 26 of the housing 22, preferably comprises an at least partially conical configuration, as illustrated throughout the Figures, structured to receive the proximal end 32 of the control member 30, which also comprises an at least partially conical configuration.

Furthermore, at least one embodiment of the universal injection valve assembly 10 of the present invention includes an adjustment guide 44 and a secondary stop 45 which is selectively positionable along at least a portion of the adjustment guide 44. In a preferred embodiment, the adjustment guide 44 comprises a cylindrical channel through a portion of the inductor 41, through which the secondary stop 45 is selectively positionable. The secondary stop 45 is positionable such that at least a portion of the secondary stop 45 extends outward beyond an adjustment guide aperture 46, thereby placing the secondary stop 45 into proximity with the proximal end 32 of the control member 30, such that the control member 30 contacts the secondary stop 45, and not the primary stop 43. More specifically, the secondary stop 45 is positionable into any one of a plurality of different contacting relationships with the control member 30, each defining a specific displacement of the control member 30 from the operative position relative to the housing 22. In addition, the secondary stop 45 further limits the displacement of the control member 30, thereby providing a plurality of partially open orientations, such as the one illustrated in FIG. 3. Each of these partially open orientations, as well as the fully open orientation, at least partially defines the accurately controlled amount of the operative fluid which will be directly injected from the universal injection valve assembly 10. This is due to the fact that each specific displacement of the control member 30 defines a specific path of flow from the chamber 25 through the outlet aperture 28 and this, ultimately and accurately, controls the rate or amount of the operative fluid directly injected from the universal injection valve assembly 10.

A further embodiment of the present invention comprises an adjustment mechanism 47 which is structured to selectively position the secondary stop 45 along the adjustment guide 44. The adjustment mechanism 47, in a preferred embodiment, comprises a metering gear interconnected to one end of the secondary stop 45 such that rotation of the adjustment mechanism 47 causes the secondary stop 45 to move longitudinally along the adjustment guide 44, either towards or away from the adjustment guide aperture 46, depending on the direction of rotation of the adjustment mechanism 47. In addition, the present invention may incorporate a drive mechanism 48, such as, by way of example only, a servo motor, which is structured to engage the adjustment mechanism 47 and thereby selectively position the secondary stop 45 along the adjustment guide 44. Further, this embodiment comprises an interface mechanism 49, such as, once again by way of example only, a servo gear, which operatively interconnects the drive mechanism 48 to the adjustment mechanism 47 so as to effect rotation of the adjustment mechanism 47 when the drive mechanism 48 is activated. Thus, when the drive mechanism 48 is activated, the interface mechanism 49 engages the adjustment mechanism 47, which rotates with the interface mechanism 49, thereby selectively positioning the secondary stop 45 along the adjustment guide 44. The drive mechanism 48 is activated in response to changing load demands on the small scale engine or other device and, in at least one embodiment, the drive mechanism 48 is activated by linkage interconnected to an accelerator pedal, such as those found in most automobiles, or the governor control in the case of a generator set. Of course, it is appreciated that alternate embodiments of the present invention may employ other devices to effect the selective positioning of the secondary stop 45 along the adjustment guide 44 which are encompassed in the scope and intent of the present invention.

The combination of the control member 30, the primary stop 43, the secondary stop 45, and the drive mechanism 48, in the universal injection valve assembly 10 of the present invention allows for a wide range of accurately controlled amounts of the operative fluid at the predetermined temperature to be directly injected into the small scale engine or other devices, such as, by way of example only, a stirling engine or a 4-cycle steam engine, as required by their varying loads, by the universal injection valve assembly 10 of the present invention. As previously indicated, the specific displacement of the control member 30, which varies with the position of the secondary stop 45, accurately controls the rate or amount of the operative fluid directly injected from the universal injection valve assembly 10. Thus, the amount of operative fluid directly injected each time the universal injection valve assembly 10 is actuated is quickly and efficiently varied by simply repositioning the secondary stop 45 utilizing the drive mechanism 48. Additionally, the cyclic rate at which the accurately controlled amount of the operative fluid is directly injected by the universal injection valve assembly 10 is easily varied by simple adjustment of the electrical switching mosfet array.

The inductor temperature control unit 50, as described above, may also be incorporated into an internally cooled motor assembly, generally shown as 110, of a self cooling motor system 100. As described above, the inductor temperature control unit 50 includes a wire 42 having a fluid passage 42' extending therethrough to permit the passage of a fluid heat transfer media. In the present embodiment, a self cooling motor system 100 comprises an internally cooled motor assembly 110 having a winding assembly generally as shown at 130 throughout the figures. In at least one embodiment, the internally cooled motor assembly 110 comprises a direct current (DC) permanent magnet motor, however, it is understood to be within the scope and intent of the present disclosure to implement the present invention with any electric motor having at least one winding.

Figure 8:
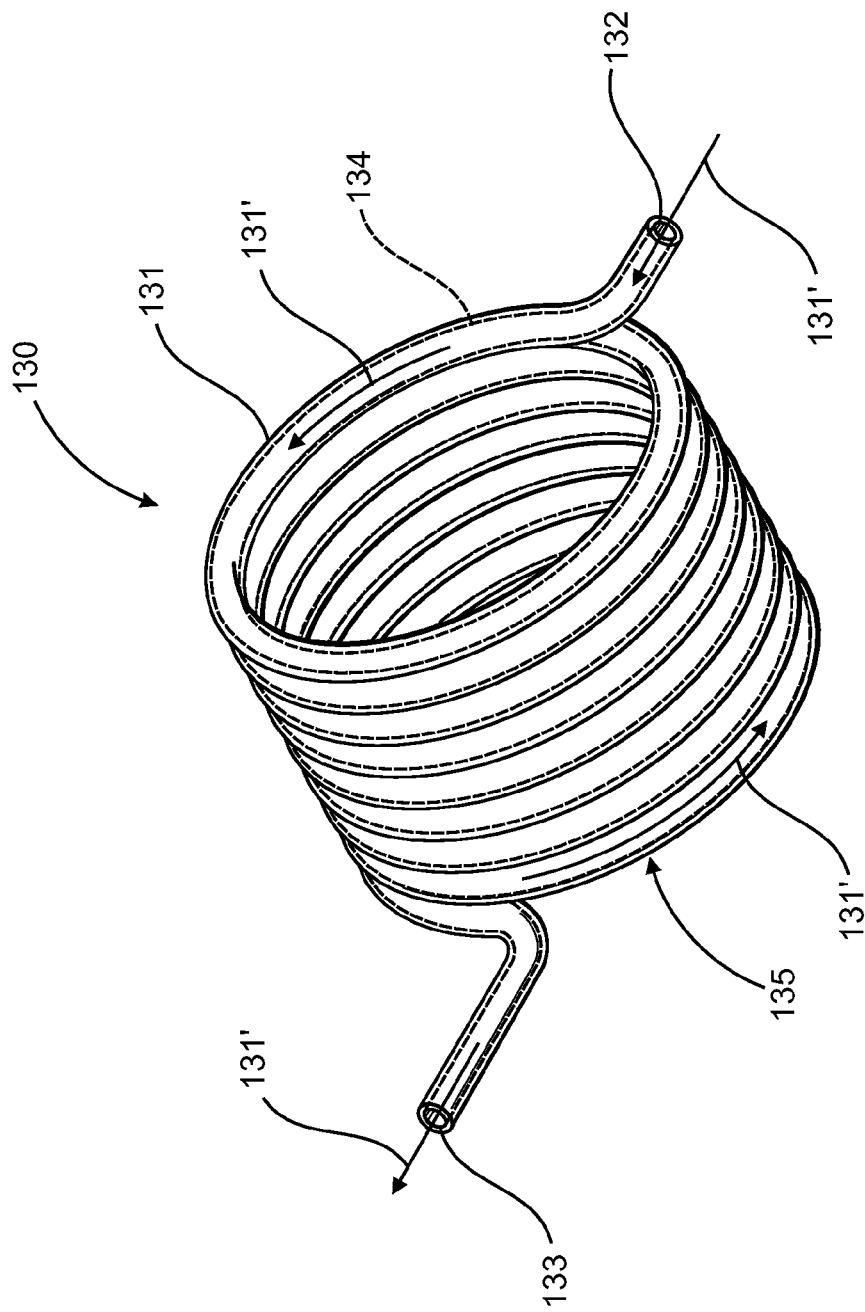
FIG. 8 is a perspective view of one embodiment of a winding comprising a progressive helix configuration in accordance with at least one embodiment of the present disclosure.

More in particular, FIG. 8 illustrates a winding assembly 130 comprising at least one winding 131. In at least one embodiment, the winding 131 is constructed of an electrically conductive material such as, by way of example only, copper, of course, other electrically conductive materials of construction may be utilized as a winding 131 in conformance with the present disclosure. In one further embodiment, the winding 131 is constructed of a low resistance copper material. Additionally, although not show in the figures, for purposes of clarity, a winding 131 for an electric motor typically includes an outer, external coating or covering comprising a material having electrical insulation properties, so as to prevent an electrical short circuit between adjacent windings 131 in the motor, or even between portions of a single winding 131 itself which are wound in a proximate or physically adjacent disposition to one another.

Looking further to FIG. 8, each winding 131 includes an inlet aperture 132 and outlet aperture 133 and a fluid passage 134 extending therebetween along a length of the winding 131, so as to permit passage of a fluid heat transfer media therethrough. In at least one embodiment, the direction of flow throughout the winding 131 is from the inlet aperture 132 to the outlet aperture 133, as indicated by directional arrows 131' in FIG. 8. More importantly, the fluid heat transfer media flowing through winding 131 removes heat from the winding 131, thereby allowing the internally cooled motor assembly 110 to operate efficiently within a prescribed operating temperature range. The winding assembly 130 of the present invention is described in greater detailed below.

Figure 4:
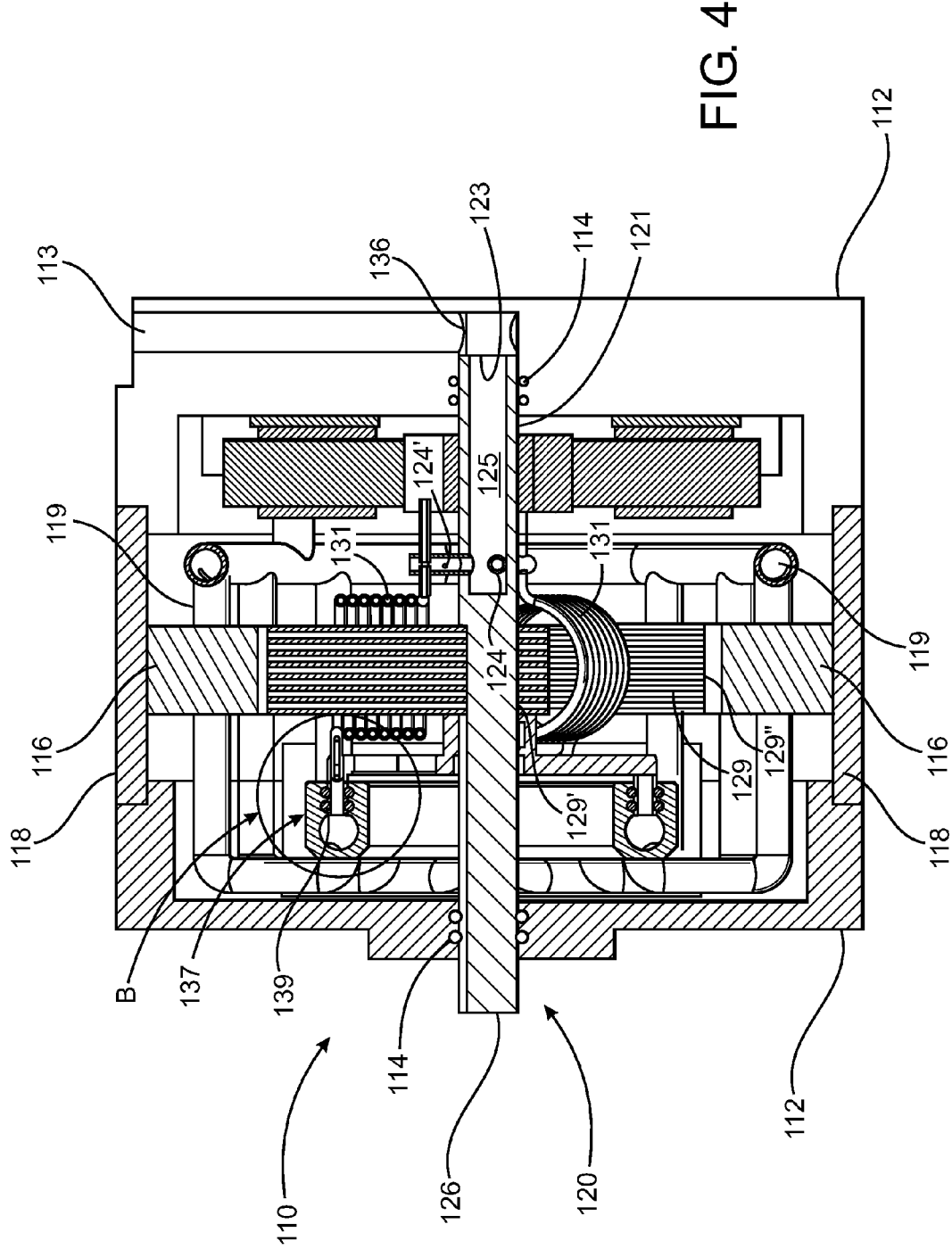
FIG. 4 is a cross-sectional view of an internally cooled motor assembly in accordance with at least one embodiment of the present disclosure.

FIG. 4 presents a cross-sectional view of an internally cooled motor assembly 110 in accordance with the present disclosure. The internally cooled motor assembly 110 comprises a frame 112 having a fluid inlet conduit 113 interconnected to an inlet fluid transfer slip ring assembly 136. As shown in FIG. 4, the fluid inlet conduit 113 extends through a portion of the frame 112 itself, however, in at least one further embodiment, the fluid inlet conduit may comprise a separate structure, such as, a pipe, tube, or hose. The frame 112 is fitted with bearings 114 which are cooperatively structured and disposed to movably support opposite ends of a shaft 121 of shaft assembly 120, as is described further below. FIG. 4 further illustrates the internally cooled motor assembly 110 comprising a magnet 116 interconnected to a yoke 118, the yoke being affixed to the frame 112 of the internally cooled motor assembly 110. The frame 112, in at least one embodiment, further serves to support a fixed component of one or more fluid transfer slip ring assembly, such as are discussed in greater detail below. As previously indicated, in at least one embodiment, the internally cooled motor assembly 110 comprises a permanent magnet DC electric motor.

Figure 6:
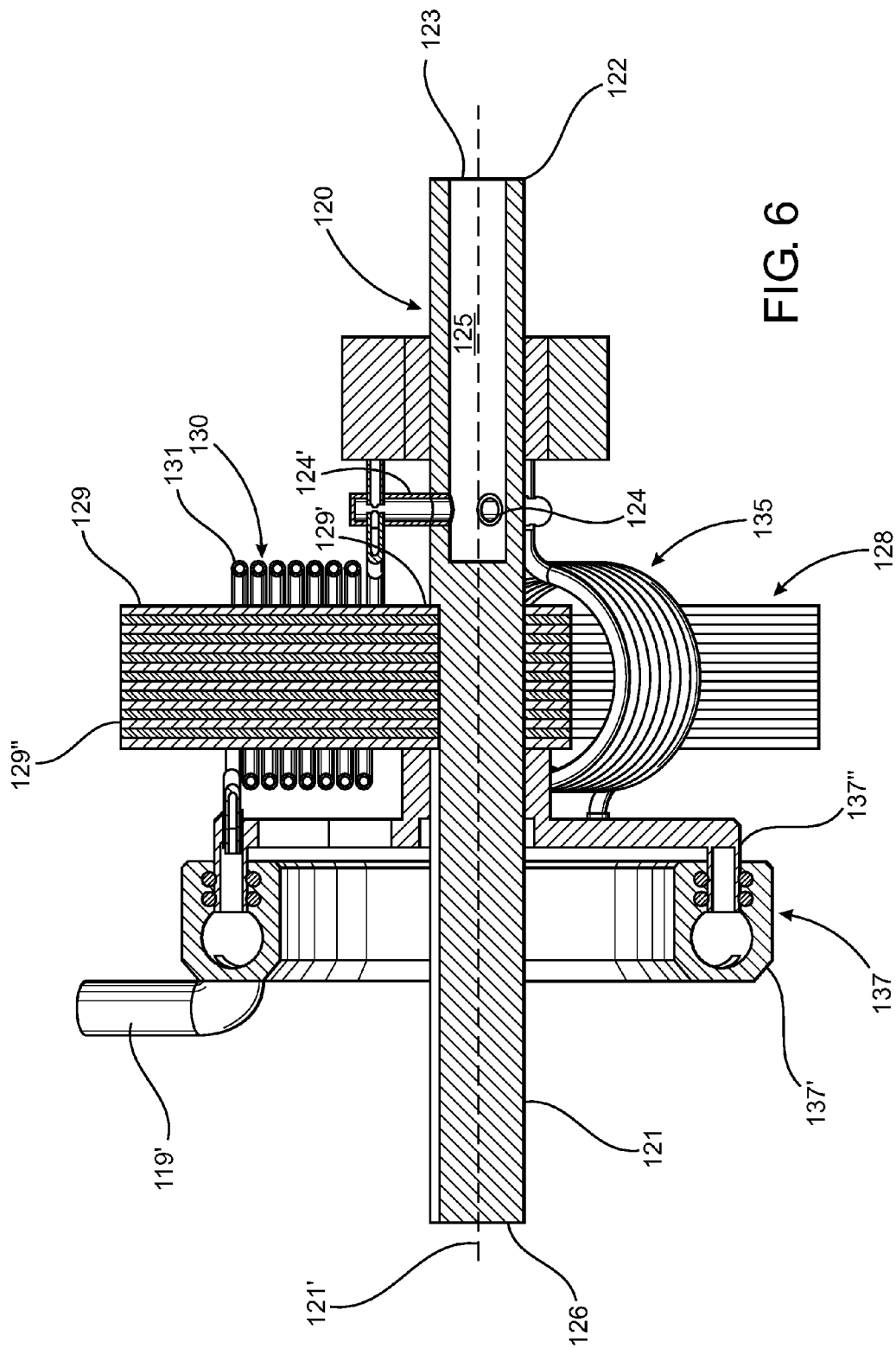
FIG. 6 is a partial cross-section view of a shaft assembly, a winding assembly, and an armature assembly in accordance with at least one embodiment of the present disclosure.

As stated above, in at least one embodiment, the internally cooled motor assembly 110 comprises a shaft assembly as shown at 120 throughout the figures. In the illustrative embodiment of FIGS. 4 and 6, the shaft assembly 120 comprises a shaft 121 having an open end 122 and a closed end 126. More in particular, in at least one embodiment, the open end 122 of the shaft 121 comprises an inlet 123 proximate open end 122, as is best illustrated in FIG. 6. Further, and as shown in FIG. 4, the inlet 123 of the shaft 121 is disposed in a fluid communicating relationship with the fluid inlet conduit 113 by way of inlet fluid transfer slip ring assembly 136. The inlet fluid transfer slip ring assembly 136 is structured to facilitate the transfer of fluid from a fixed component to a moving component, while minimizing, and in at least one embodiment, essentially eliminating, leakage of the fluid between the fixed and moving components. More in particular, in the embodiment illustrated in FIGS. 4 and 6, the inlet fluid transfer slip ring assembly 136 is structured to allow transfer of a fluid, such as, by way of example only, a fluid heat transfer media, from the fluid inlet conduit 113 to the inlet 123 of the open end 122 of shaft 121, while the shaft 121 rotates about its axis 121', facilitated by bearings 114. That is to say, the inlet fluid transfer slip ring assembly 136 is structured to provide a fluid communicating interconnection between a fixed component, i.e., the fluid inlet channel 113, and a moving component, i.e., the shaft 121, of the internally cooled motor assembly 110, with minimal leakage of the fluid heat transfer media at the point of transfer between the two components.

As illustrated in the figures, the open end 122 of the shaft 121 comprises a channel 125 extending from the inlet 123 at one end to at least one outlet 124 disposed at an opposite end of the channel 125. In at least one embodiment, the outlet 124 is disposed a distance from the inlet 123 which is equal to approximately half the overall length of the shaft 121. Further, in at least one embodiment, the outlet 124 of the shaft 121 comprises an insulator 124' constructed of an electrically insulating material, such as, by way of example, a ceramic material, thereby electrically isolating the winding assembly 130 from the shaft assembly 120. More in particular, the insulator 124' serves to electrically isolate the winding 131 itself from the shaft 121 which in turn is disposed in an interconnected relation to the frame 112 of the internally cooled motor assembly 110. It is, of course, within the scope and intent of the present disclosure for the insulator 124' to be constructed from other materials comprising sufficient electrical insulating properties to electrically isolate the winding 131 form the shaft 121.

As is best illustrated in FIG. 6, although electrically insolated from shaft assembly 120, at least one winding 131 of the winding assembly 130 is structured and disposed in an interconnected and fluid communicating relation with the shaft 121, and in particular, the open end 122 of the shaft. Further, insulator 124' is constructed of an electrically insulating material having a fluid passage therethrough so as to provide a fluid interconnection between the channel 125 of the open end 122 of the shaft 121 and the inlet aperture 132 of at least one winding 131 of winding assembly 130.

Figure 7:
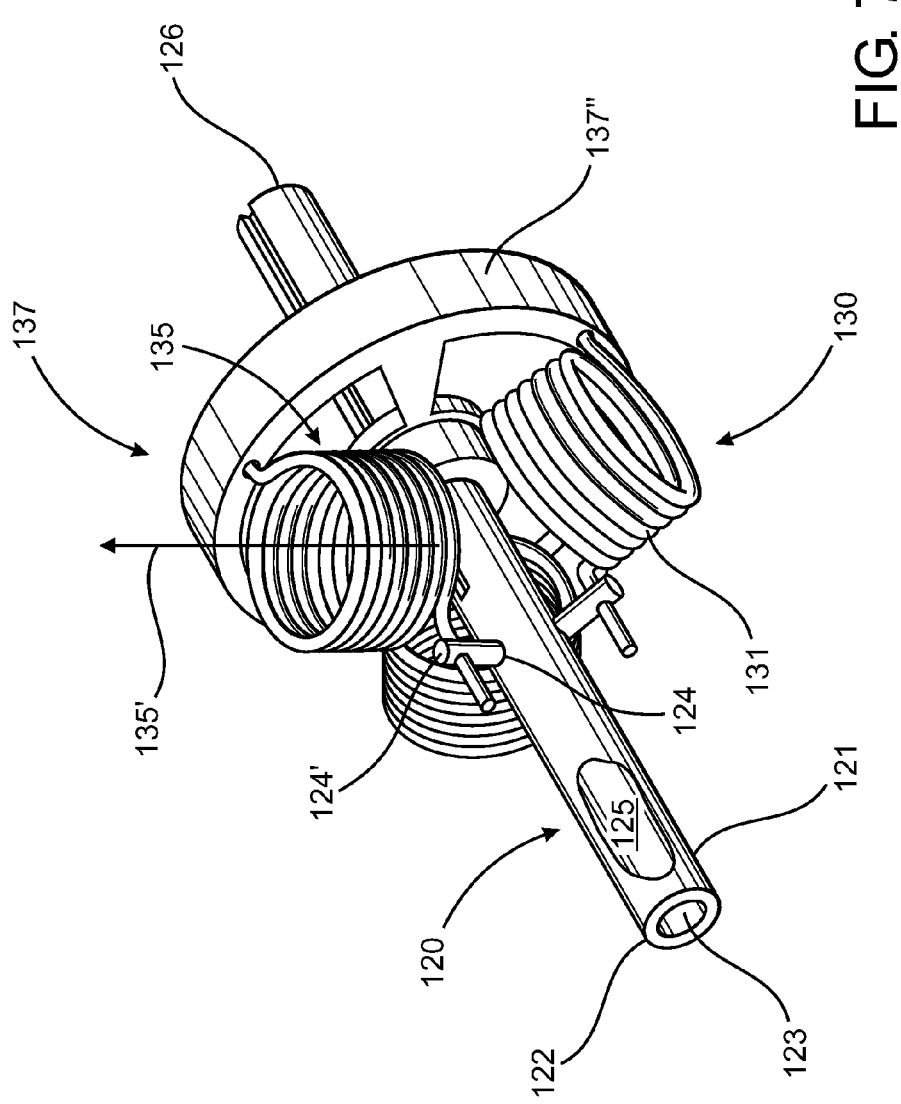
FIG. 7 is a partial perspective view of a shaft assembly and a winding assembly in accordance with at least one embodiment of the present disclosure.

As will be appreciated from the present disclosure, although an internally cooled motor assembly 110 has been heretofore described as comprising at least one winding 131, in at least one embodiment, the winding assembly 130 comprises a plurality of windings 131, each winding 131 being independently and fluidly interconnected to the channel 125 of the open end 122 of shaft 121 via an insulator 124', as illustrated best in FIG. 7. Further, in at least one embodiment, the winding assembly 130 may comprise duplex or triplex helix windings 131 wherein two or three separate helix windings 131, respectively, are arranged in an overlying relation to a single pole 129. In such a configuration, the flow of a fluid heat transfer media may be in a parallel arrangement, i.e., a single outlet 124 disposed in fluid communication with each of the plurality of windings 131, or independently, i.e., a separate outlet 124 disposed in fluid communication with each of the individual windings 131.

In an embodiment comprising duplex or triplex helix windings 131, the windings 131 are electrically interconnected to one another to form an electrical circuit with one another, and in at least one embodiment, with other windings 131 of the winding assembly 130. It will be appreciated that the duplex or triplex helix windings 131 may be electrically interconnected to one another in either a series or parallel configuration. Similarly, a winding assembly 130 comprising a plurality of windings 131 disposed on a corresponding plurality of poles 129, as discussed in detail below, may also be electrically interconnected to one another in either a series or parallel configuration. In at least one embodiment, the plurality of windings 131 of the winding assembly 130 are electrically interconnected to one another in a series configuration.

Looking further to the figures, the shaft assembly 120 of the internally cooled motor assembly 110 comprises an armature assembly 128 mounted thereto. The armature assembly 128, in one embodiment, comprises at least one pole 129 having a proximal end 129' disposed adjacent shaft 121 and a distal end 129" disposed outwardly from the shaft 121. More in particular, in at least one embodiment, the proximal end 129' of the pole 129 is affixed to the shaft 121, and the pole 129 is structured to extend outwardly and substantially perpendicular to the shaft 121, terminating at the distal end 129". Of course, as is illustrated in the figures, at least one further embodiment of the internally cooled motor assembly 110 comprises a plurality of poles 129 affixed to the shaft 121, extending outwardly therefrom and substantially perpendicular thereto, each pole 129 being structured to rotate therewith. In at least embodiment, each of the plurality of poles 129 are affixed to the shaft 121 at equidistant positions relative to one another about its diameter, e.g., 2 poles at 180 degrees apart, 3 poles at 120 degrees apart, etc. In at least one embodiment, the pole(s) 129 are constructed of a plurality of layers of steel which are laminated lengthwise to one another. The purpose of the laminated structure is to affect a discontinuous electrical pathway through the pole(s) 129 so as to minimize the generation of eddy currents, and the magnetic field hysteresis losses associated therewith.

The figures further illustrate the interrelationship between each of the plurality of poles 129 of the armature assembly 128, and corresponding ones of a plurality of windings 131 of a winding assembly 130. Specifically, FIGS. 4 and 6 illustrate an embodiment wherein a winding 131 is disposed in an overlying relation to a corresponding pole 129. Moreover, the figures illustrate a progressive helix configuration of a winding 131 extending along a corresponding pole 129 from a proximal end 129' to a distal end 129" thereof.

More in particular, and as illustrated best in FIG. 7, in at least one embodiment, the windings 131 of winding assembly 130 each comprises a helix configuration 135, and in at least one further embodiment, a progressive helix configuration structured such that a direction of flow 135' from the shaft 121 through each winding 131 into a fluid outlet manifold 119 is as shown by the directional arrow in FIG. 7. As used herein, the phrase "progressive helix winding" shall mean a winding 131 having a radial flow path that is unobstructed in an outward direction, i.e., substantially perpendicular, to shaft 121. Specifically, the direction of flow 135' through each winding 131 is from the inlet aperture 132 proximate the shaft 121 outwardly towards the outlet aperture 133, the outlet aperture 133 being disposed in a fluid communicating relation to an outlet fluid transfer slip ring assembly 137.

The progressive helix configuration 135 of the winding 131 of the present embodiment is structured such that rotation of the shaft 121 at a predetermined speed creates a centrifugal force sufficient to generate and maintain a predetermined flowrate of a fluid heat transfer media through the fluid passage 134 of the winding 131. The centrifugal force generated is proportional to the rotational velocity of the shaft 121, and more specifically, the centrifugal force is directly proportional to the square of the rotational velocity of the shaft 121. The exact value of the centrifugal force generated is further dependant on the physical properties of the fluid heat transfer media which is flowing through the winding 131, including, but not limited to, its specific gravity, temperature and pressure. The specific gravity of the fluid heat transfer media is a primary factor because the greater the specific gravity, i.e., the "heavier" the fluid heat transfer media per unit volume, the greater the centrifugal force generated at a fixed rotational velocity. Other factors which may impact the exact amount of centrifugal force generated include the number of windings, the internal diameter of the fluid passage 134 through the winding 131, the friction factors applicable based upon the material of construction and the physical configuration of the winding 131.

Once again, as noted above and as illustrated in FIG. 7, the direction of flow 135' of the fluid heat transfer media is from the shaft 121 through each winding 131, in a direction from an inlet aperture 132 to an outlet aperture 133, and into the fluid outlet manifold 119. Furthermore, the predetermined flowrate of the fluid heat transfer media through the fluid passage 134 of each winding 131 of the winding assembly 130 is sufficient to transfer a predetermined amount of heat from each winding 131 to the fluid heat transfer media so as to maintain the operating temperature of the internally cooled motor assembly 110 within an acceptable operating range. In at least one embodiment, the acceptable operating temperature range is between approximately 32 and 212 degrees Fahrenheit. In an embodiment comprising a permanent magnet DC electric motor having low resistance copper windings 131, and employing distilled water as the fluid heat transfer media, a maximum operating efficiency is attained when the operating temperature is between approximately 75 and 200 degrees Fahrenheit.

Figure 5:
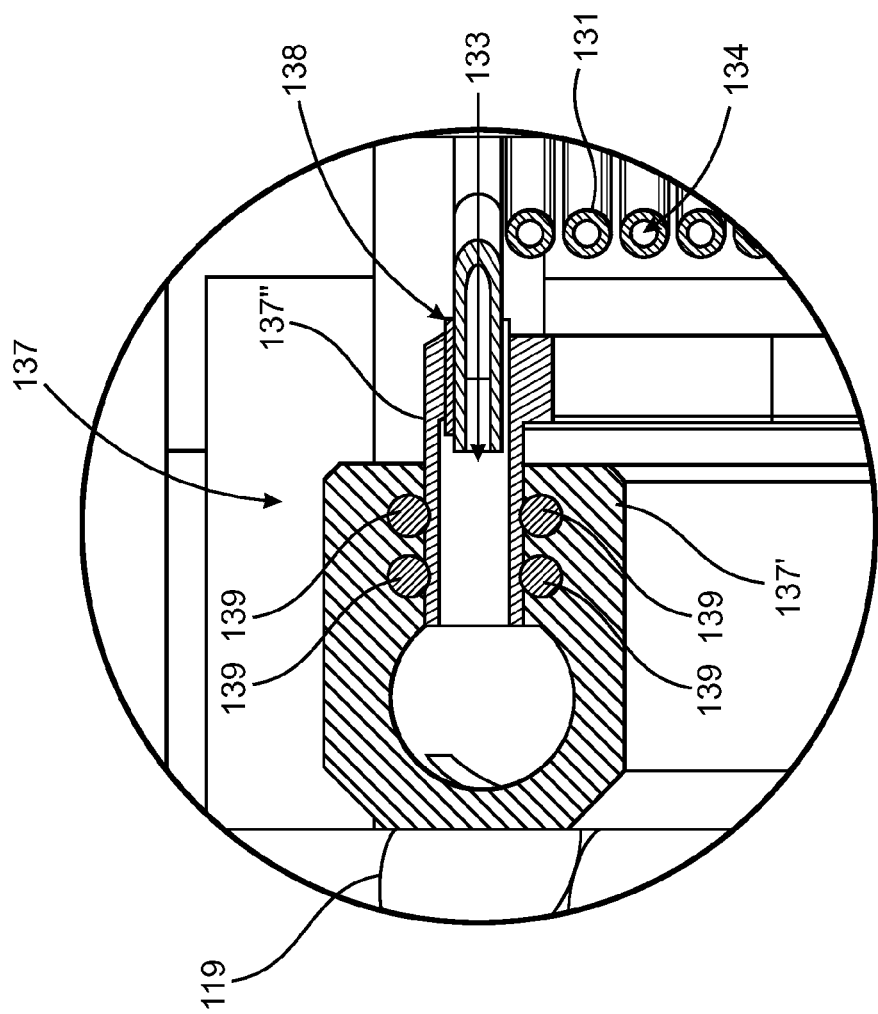
FIG. 5 is an exploded cross-sectional view of a portion of an outlet fluid transfer slip ring assembly, as shown in FIG. 4 at "B".

As indicated above, the outlet aperture 133 of each winding 131 is disposed in a fluid communicating relationship with a fluid outlet manifold 119, and in at least one embodiment, an outlet fluid transfer slip ring assembly 137, such as is illustrated in inset "B" of FIG. 4 and in detail in FIG. 5, is utilized to facilitate fluid communication between the moving winding(s) 131 and the fixed fluid outlet manifold 119. Looking specifically to the illustrative embodiment of FIG. 5, the outlet fluid transfer slip ring assembly 137 is structured to provide a fluid communicating interconnection between the outlet aperture 133 of winding 131 and a fluid outlet manifold 119. More in particular, and similar to the inlet fluid transfer slip ring assembly 136, the outlet fluid transfer slip ring assembly 137 is structured to provide a fluid communicating interconnection between a fixed component, i.e., outlet fluid manifold 119, and a moving component, i.e., winding 131, of the internally cooled motor assembly 110. As such, the outlet fluid transfer slip ring assembly 137 comprises, in at least one embodiment, a fixed member 137' and a rotating member 137". The fixed member 137' is disposed in a fluid communicating relationship with fluid outlet manifold 119 and is structured to receive at least a portion of the rotating member therein, as illustrated best in FIG. 5. As FIG. 5 further demonstrates, one or more seals 139 may be disposed in a contacting relation to the rotating member 137" within the receiving portion of the fixed member 137', to facilitate movement of the rotating member 137" within the fixed member 137', as well as to minimize leakage of fluid heat transfer media therebetween. In at least one embodiment, the outlet fluid transfer slip ring assembly 137 comprises an annular configuration, as shown in the figures. Further, a fluid outlet axis 133" is positioned a radial distance outwardly from a fluid inlet axis 121", thereby establishing a radial fluid flow path characteristic through the present assembly.

FIG. 5 further illustrates that rotating member 137" of the outlet fluid transfer slip ring assembly 137 is affixed to a portion of a winding 131, specifically, proximate an outlet aperture 133 of the winding 131, in a fluid communicating relation. As such, the outlet fluid transfer slip ring assembly 137 is structured to facilitate a flow of a fluid heat transfer media from the outlet aperture 133 of the winding 131, while the winding 131 is rotating with the shaft assembly 120 and armature assembly 128, into the fluid outlet manifold 119 of the internally cooled motor assembly 110. Also similar to the interconnection between the winding 131 and the channel 125 of the shaft 121, an insulator 138 is disposed between the winding 131 and the rotating member 137" of the outlet fluid slip ring assembly 137, so as to electrically isolate the winding 131 from other components of the internally cooled motor assembly 110. As before, in at least one embodiment, the insulator 138 may be constructed of a ceramic material, however, other materials of construction comprising sufficient electrical insulating properties may also be utilized.

Figure 9:
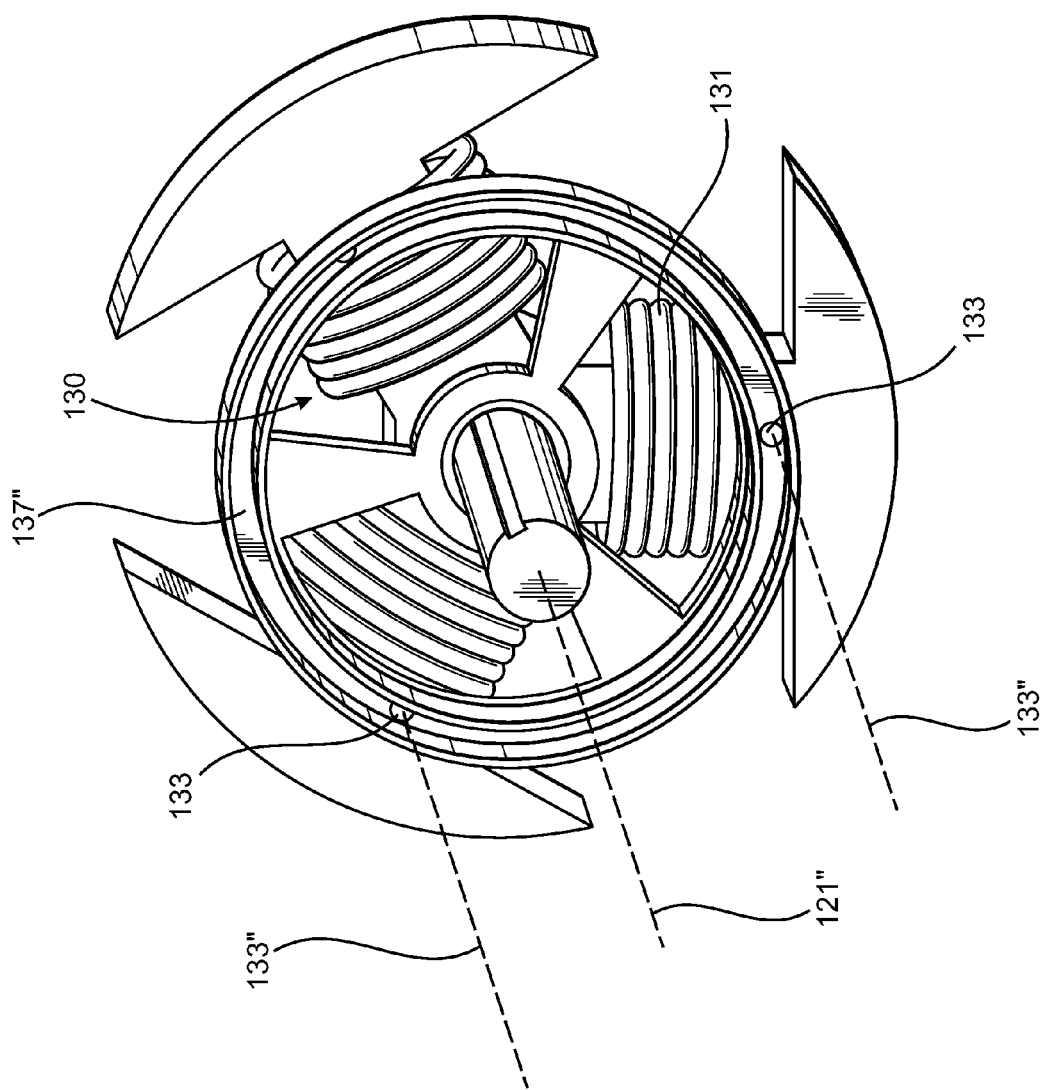
FIG. 9 is a partial perspective view of a shaft assembly having an armature assembly and a winding assembly mounted thereto, illustrating a portion of an outlet slip ring assembly in accordance with at least one embodiment of the present disclosure.

As previously stated, the fluid heat transfer media follows a radial flow path through the internally cooled motor assembly 110. As shown in FIG. 9, a fluid inlet axis is represented at 121", and is disposed substantially along the axis 121' of the shaft 121 as is shown in FIG. 6. Further, a fluid outlet axis 133" is illustrated in FIG. 9 for each outlet aperture 133 of the plurality of windings 131. As is clearly illustrated in FIG. 9, each fluid outlet axis 133" is radially offset from the fluid inlet axis 121", thereby establishing a radial fluid flow path through the internally cooled motor assembly 110. FIG. 9 is further illustrative of at least one embodiment of the annular configuration of the rotating member 137" of the outlet fluid transfer slip ring assembly 137.

In addition to the internally cooled motor assembly 110, the self cooling motor system 100 of the present disclosure comprises a heat transfer assembly 140 operatively interconnected to the internally cooled motor assembly 110. More in particular, and as illustrated best in FIG. 10, the heat transfer assembly 140 comprises a heat transfer unit 141 which is structured to transfer a predetermined amount of heat from a fluid heat transfer media upon passage therethrough, wherein said predetermined amount of heat is at least partially defined by an exit temperature of the fluid heat transfer media from the heat transfer unit 141. In an embodiment employing distilled water as a fluid heat transfer media, an exit temperature of the fluid heat transfer media will be in the range of about 75 to 200 degrees Fahrenheit. To facilitate the transfer of the predetermine amount of heat from the fluid heat transfer media, the heat transfer unit 141 comprises a heat transfer fluid inlet 142 which is disposed in fluid communication with the fluid outlet manifold 119 of the internally cooled motor assembly 110. Further, heat transfer unit 141 includes a heat transfer fluid outlet 144 which is disposed in fluid communication with the fluid inlet conduit 113 of the internally cooled motor assembly 110.

Figure 10:
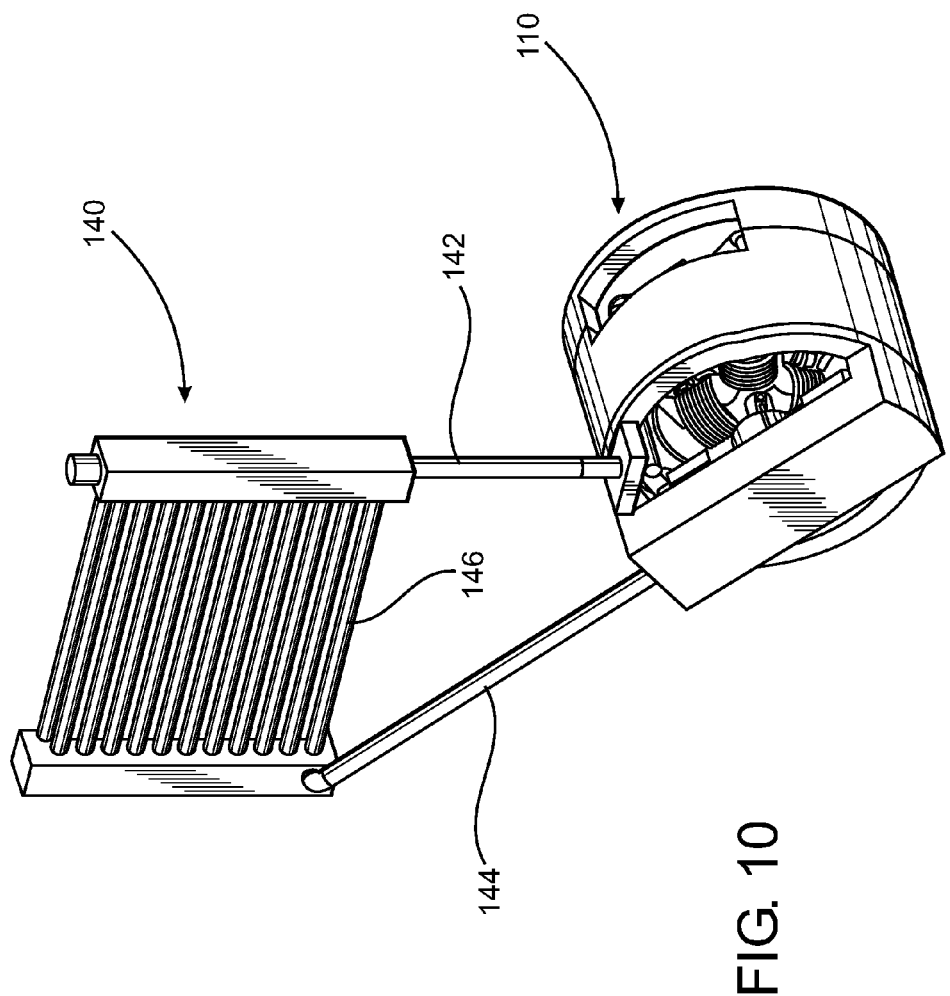
FIG. 10 is a perspective view of a self cooling motor system comprising an internally cooled motor assembly and a heat transfer assembly in accordance with at least one embodiment of the present disclosure.

As illustrated in FIG. 10, heat transfer unit 141 further comprises a heat transfer section 146 disposed between heat transfer fluid inlet 142 and heat transfer fluid outlet 144. While heat transfer section 146 as shown in FIG. 10 comprises an air cooled radiator type configuration, it is understood to be well within the scope and intent of the present disclosure for the heat transfer unit 141 to comprise any of a variety of heat transfer mechanisms including, but not limited to, a shell-and-tube heat exchanger, air-fin heat exchanger, plate or spiral-plate heat exchanger, etc.

Thus, and as will be appreciated from the foregoing description and the figures presented herein, the self cooling motor system 100 of the present disclosure is not only self cooling by virtue of the winding assembly 130 including windings 131 having the fluid passage 134 extending therethrough to permit a fluid heat transfer media to pass therethrough and remove heat generated in the windings 131. The foregoing disclosures and figures further demonstrate that once a predetermined operational speed is attained, the internally cooled motor assembly 110 is also self pumping as a result of the centrifugal forces generated by the rotation of the shaft 121. In at least one embodiment, wherein the winding(s) 131 are constructed of a low resistance copper material, and water is employed as a fluid heat transfer media, the predetermined operating speed ranges from between about 100 to 8,000 revolutions per minute.

Upon startup of the internally cooled motor assembly 110, flow of the fluid heat transfer media may need to be "primed" to expel any vapor in the system and initiate flow, such as, by way a bleed-off valve, however, once primed and operating, the "self-pumping" action will occur and be maintained. As illustrated in FIG. 6, fluid outlet manifold 119 comprises a discharge 119' which is disposed at a greater elevation than the inlet 123 of the shaft 121, to facilitate the discharge of any vapor which may become entrained in the fluid heat transfer media, to prevent vapor locks which could disrupt the "self pumping" action of the present assembly.

Once primed and operating within a predetermined operating speed range, centrifugal forces generated by the rotation of the shaft are sufficient to maintain the predetermined flowrate of the fluid heat transfer media through not only the windings 131 of the internally cooled motor assembly 110, but through the heat transfer assembly 140 of the self cooling motor system 100. As will be appreciated, this unique combination of an internally cooled winding 131 comprising a progressive helix configuration 135 in combination with shaft 121 rotating at a predetermined speed to effect "self pumping" results in an internally cooled motor assembly 110 which is capable of operating at overall efficiencies heretofore unachievable in a direct current (DC) permanent magnet motor, due to overheating of their windings while operating continuously under sustained loads.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described.

What is claimed is:

1. An internally cooled motor comprising:
   a frame,
   a shaft assembly comprising a shaft having an open end and a sealed end, wherein said open end comprises an inlet and an outlet interconnected in a fluid communicating relation by a channel extending therebetween,
   said frame comprising bearings disposed at opposite ends, said shaft supported in said frame in a rotational configuration via said bearings,
   an armature assembly mounted to said shaft and structured to rotate therewith, said armature assembly comprising at least one pole extending outwardly and substantially perpendicular to said shaft,
   said at least one pole having a proximal end disposed adjacent said shaft and a distal end disposed outwardly from said shaft, a winding assembly comprising at least one winding affixed to said armature assembly, wherein said at least one winding is disposed in an overlying relation to said at least one pole, said winding comprising an inlet aperture and an outlet aperture, said winding further comprising a fluid passage extending lengthwise therethrough between said inlet aperture and said outlet aperture to facilitate passage of a fluid heat transfer media through said winding, an inlet fluid transfer slip ring assembly interconnected to said open end of said shaft and disposed in a fluid transferring configuration with said inlet of said shaft, said outlet of said shaft interconnected to said inlet aperture of said winding and disposed in a fluid transferring relation therewith, an outlet fluid transfer slip ring assembly interconnected to said outlet aperture of said winding and disposed in a fluid transferring orientation therewith, wherein said outlet aperture of said winding is disposed proximate said distal end of said at least one pole extending outwardly from said shaft, said winding comprising a helix configuration between said inlet aperture and said outlet aperture, said helix configuration structured such that rotation of said shaft at a predetermined speed creates a centrifugal force sufficient to maintain a predetermined flowrate of said fluid heat transfer media through said fluid passage of said winding, wherein a flow of said fluid heat transfer media through said winding is in a direction from said inlet aperture to said outlet aperture along a radial flow path, and wherein said predetermined flowrate of said fluid heat transfer media through said fluid passage of said winding results in a transfer of a predetermined amount of heat from said winding to said fluid heat transfer media, thereby maintaining an operating temperature of said internally cooled motor assembly within a predetermined operating range.

2. The assembly as recited in claim 1 wherein said winding comprise a copper wire having said fluid passage extending lengthwise therethrough between said inlet aperture and said outlet aperture to facilitate passage of said fluid heat transfer media therethrough.

3. The assembly as recited in claim 2 wherein said winding is electrically insulated from said shaft.

4. The assembly as recited in claim 2 wherein said winding is electrically insulated from said outlet fluid transfer slip ring assembly.

5. The assembly as recited in claim 4 wherein said winding is electrically insulated from said shaft.

6. The assembly as recited in claim 1 wherein said winding comprises a progressive helix configuration.

7. The assembly as recited in claim 1 wherein said fluid transferring configuration is at least partially defined by said inlet fluid transfer slip ring assembly structured to transfer said fluid heat transfer media to said inlet of said shaft.

8. The assembly as recited in claim 1 wherein said fluid transferring relation is at least partially defined by said outlet of said shaft being interconnected to said inlet aperture of said winding and structured to permit transfer said fluid heat transfer media from said inlet of said shaft to said inlet aperture of said winding.

9. The assembly as recited in claim 1 wherein said fluid transferring orientation is at least partially defined by said outlet fluid transfer slip ring assembly structured to receive said fluid heat transfer media from said outlet aperture of said winding.

10. The assembly as recited in claim 1 wherein said fluid heat transfer media comprises an electrically non-conductive composition.

11. An internally cooled motor assembly comprising:
a frame, a shaft assembly comprising a shaft having an open end and a sealed end, wherein said open end comprises an inlet and an outlet interconnected in a fluid communicating relation by a channel extending therebetween, said frame comprising bearings disposed at opposite ends, said shaft supported in said frame in a rotational configuration via said bearings, an armature assembly mounted to said shaft and structured to rotate therewith, said armature assembly comprising a plurality of poles extending outwardly and substantially perpendicular to said shaft, each of said plurality of poles having a proximal end disposed adjacent said shaft and a distal end disposed outwardly from said shaft, a winding assembly comprising a plurality of windings affixed to said armature assembly, wherein at least one of said plurality of windings is disposed in an overlying relation to a corresponding one of each of said plurality of poles, each of said windings comprising an inlet aperture and an outlet aperture, each of said windings further comprising a fluid passage extending lengthwise therethrough between said inlet aperture and said outlet aperture to facilitate passage of a fluid heat transfer media therethrough, an inlet fluid transfer slip ring assembly interconnected to said open end of said shaft and disposed in a fluid transferring configuration with said inlet of said shaft, said outlet of said shaft interconnected to said inlet aperture of each of said windings and disposed in a fluid transferring relation therewith, an outlet fluid transfer slip ring assembly interconnected to said outlet aperture of each of said windings and disposed in a fluid transferring orientation therewith, wherein said outlet aperture of each of said windings is disposed proximate said distal end of said at least one pole extending outwardly from said shaft, each of said windings comprising a helix configuration between said inlet aperture and said outlet aperture, said helix configuration structured such that rotation of said shaft at a predetermined speed creates a centrifugal force sufficient to maintain a predetermined flowrate of said fluid heat transfer media through said fluid passage of each of said windings, wherein a flow of said fluid heat transfer media through each of said windings is in a direction from said inlet aperture to said outlet aperture of each said windings along a radial flow path, and wherein said predetermined flowrate of said fluid heat transfer media through said fluid passage of each of said windings results in a transfer of a predetermined amount of heat from each of said windings to said fluid heat transfer media, thereby maintaining an operating temperature of said internally cooled motor assembly within a predetermined operating range.

12. The assembly as recited in claim 11 further comprising an insulator disposed between said inlet aperture of each of said plurality of windings and said outlet of said shaft, said insulator structured to electrically isolate each of said plurality of windings from said shaft, while permitting a transfer of fluid heat transfer media from said outlet of said shaft to each of said plurality of windings.

13. The assembly as recited in claim 11 further comprising an insulator disposed between said outlet aperture of each of said plurality of windings and said outlet fluid transfer slip ring assembly, each said insulator structured to electrically isolate a corresponding one of said plurality of windings from said outlet fluid transfer slip ring assembly, while permitting a transfer of fluid heat transfer media from said outlet aperture of each of said plurality of windings to said outlet fluid transfer slip ring assembly.

14. A self cooling motor system comprising:
   an internally cooled direct current motor assembly, wherein said motor assembly comprises:
      a frame comprising bearings disposed at opposite ends, said bearing supporting a shaft in a rotational configuration relative to said frame,
      an armature assembly mounted to said shaft and structured to rotate therewith,
      a winding assembly affixed to at least a portion of said armature assembly in an overlying relation,
      said winding assembly comprising at least one winding having an inlet aperture and an outlet aperture and a fluid passage extending lengthwise therebetween to permit a flow of a fluid heat transfer media therethrough,
      a fluid inlet conduit disposed and interconnected in a fluid communicating relation with said shaft,
      said shaft being further interconnected to said inlet aperture of said winding, said shaft structured to permit said flow of said fluid heat transfer media from said fluid inlet conduit to said inlet aperture of said winding,
      a fluid outlet manifold interconnected in a fluid communicating relation with said outlet aperture of said winding,
   said winding comprising a helix configuration between said inlet aperture and said outlet aperture, wherein said outlet aperture is disposed in an outwardly extending orientation relative to said inlet aperture and said shaft,
   said helix configuration structured such that rotation of said shaft within a predetermined operating speed range generates a centrifugal force sufficient to maintain a predetermined flowrate of said fluid heat transfer media through said winding from said inlet aperture to said outlet aperture, and
      wherein said predetermined flowrate of said fluid heat transfer media through said winding results in a transfer of a predetermined amount of heat from said winding to said fluid heat transfer media, thereby maintaining an operating temperature of said internally cooled motor assembly within a predetermined operating temperature range, and
   a heat transfer assembly disposed in a fluid communicating relation between said fluid outlet manifold and said fluid inlet conduit of said internally cooled direct current motor assembly.

15. The system as recited in claim 14 wherein said heat transfer assembly comprises a heat transfer unit structured to transfer a predetermined amount of heat from said fluid heat transfer media received from said fluid outlet manifold of said internally cooled direct current motor assembly.

16. The system as recited in claim 15 wherein said predetermined amount of heat is at least partially defined by an exit temperature of said fluid heat transfer media from said heat transfer unit.

17. The system as recited in claim 16 wherein said flow of said fluid heat transfer media through said fluid heat transfer unit at said predetermined flowrate is in a direction from said fluid outlet manifold to said fluid inlet conduit of said internally cooled direct current motor assembly.

18. The system as recited in claim 17 wherein said heat transfer unit is further structured to discharge said fluid heat transfer media at approximately said exit temperature to said fluid inlet conduit of said internally cooled direct current motor assembly.

19. The system as recited in claim 16 wherein said exit temperature is between about 75 and 200 degrees Fahrenheit.

20. The system as recited in claim 14 wherein said predetermined speed is between about 100 and 8,000 revolutions per minute.

21. The system as recited in claim 14 wherein said predetermined operating temperature is between about 75 and 200 degrees Fahrenheit.

22. The system as recited in claim 14 wherein said flow of said fluid heat transfer media through said fluid heat transfer unit is substantially driven by said centrifugal force generated by operation of said internally cooled motor assembly.

23. The system as recited in claim 14 wherein said flow of said fluid heat transfer media through said fluid heat transfer unit is solely driven by said centrifugal force generated by operation of said internally cooled motor assembly.

* * * * *